(12) United States Patent
Koka et al.

(10) Patent No.: US 11,261,788 B2
(45) Date of Patent: Mar. 1, 2022

(54) SYSTEMS AND METHODS FOR DRY FOG INLET PARTICLE SEPARATOR

(71) Applicant: HONEYWELL INTERNATIONAL INC., Morris Plains, NJ (US)

(72) Inventors: Tirumala Rao Koka, Karnataka (IN); Shailesh Kumar, Uttter pradesh (IN); Karthik Narayanasamy, Karnataka (IN); Yogendra Yogi Sheoran, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 264 days.

(21) Appl. No.: 16/355,392

(22) Filed: Mar. 15, 2019

(65) Prior Publication Data

US 2020/0291855 A1    Sep. 17, 2020

(51) Int. Cl.
*F02C 7/05* (2006.01)
*B01D 45/16* (2006.01)
(Continued)

(52) U.S. Cl.
CPC ............ *F02C 7/05* (2013.01); *B01D 45/16* (2013.01); *B01D 47/06* (2013.01); *B01D 50/004* (2013.01); *B01D 51/02* (2013.01); *F02C 7/052* (2013.01)

(58) Field of Classification Search
CPC ............ F02C 7/05–055; F02C 7/28; B64D 2033/0246; B64D 2033/022; B01D 51/02; B01D 51/04; B01D 47/06
See application file for complete search history.

(56) References Cited

U.S. PATENT DOCUMENTS 3,338,049 A   8/1967   Fernberger
3,371,471 A   3/1968   Connors
(Continued)

FOREIGN PATENT DOCUMENTS

CN   104258661   1/2015
CN   205850472   1/2017
(Continued)

OTHER PUBLICATIONS

Dust Solutions Inc, "Dry Fog Systems" and "Compared To Water Spray", Jun. 11, 2013 and Jan. 31, 2016, at https://www.nosudt.com via Wayback Machine (Year: 2016).*
(Continued)

*Primary Examiner* — Stephanie Sebasco Cheng
(74) *Attorney, Agent, or Firm* — Lorenz & Kopf, LLP

(57) ABSTRACT

An inlet particle separator system for a gas turbine engine includes a separator manifold. The separator manifold includes an inlet upstream from an outlet. The inlet is to receive an incoming airflow, and the outlet is to be fluidly coupled to an inlet of the gas turbine engine. The inlet particle separator system includes at least one dry fog nozzle coupled proximate the inlet so as to face at least partially away from the inlet. The dry fog nozzle is external to the separator manifold, and the dry fog nozzle is to direct a spray of dry fog in a direction transverse to the incoming airflow to agglomerate with fine particles in the incoming airflow to form agglomerated particles. The inlet particle separator system includes a scavenging system coupled to the separator manifold downstream from the inlet, and the scavenging system removes the agglomerated particles from the separator manifold.

14 Claims, 7 Drawing Sheets

(51) Int. Cl.
  *B01D 47/06* (2006.01)
  *B01D 50/00* (2006.01)
  *B01D 51/02* (2006.01)
  *F02C 7/052* (2006.01)

(56) References Cited

U.S. PATENT DOCUMENTS

| | | | |
|---|---|---|---|
| 3,521,431 A * | 7/1970 | Buckley | F02C 7/052 |
| | | | 55/306 |
| 3,993,463 A | 11/1976 | Barr | |
| 4,456,458 A * | 6/1984 | Gilbertson | F02M 35/022 |
| | | | 55/306 |
| 4,685,942 A | 8/1987 | Klassen et al. | |
| 4,713,120 A | 12/1987 | Hodgens, II et al. | |
| 5,725,180 A * | 3/1998 | Chamay | B64D 33/02 |
| | | | 244/53 B |
| 6,134,874 A | 10/2000 | Stolen | |
| 7,927,408 B2 | 4/2011 | Sheeran et al. | |
| 8,079,809 B2 * | 12/2011 | Selder | F02C 6/20 |
| | | | 415/214.1 |
| 9,206,740 B2 * | 12/2015 | Wong | F01D 25/002 |
| 10,508,626 B2 * | 12/2019 | Dionne | B64D 33/02 |
| 10,695,704 B2 * | 6/2020 | Mook | F02C 7/052 |
| 2014/0144123 A1 | 5/2014 | Judd et al. | |
| 2014/0190347 A1 | 7/2014 | Wong et al. | |
| 2018/0209340 A1 | 7/2018 | Renninger et al. | |

FOREIGN PATENT DOCUMENTS

| | | |
|---|---|---|
| CN | 105259877 | 1/2018 |
| EP | 0087229 A1 | 8/1983 |

OTHER PUBLICATIONS

Dry fog dust removal—Dry Fog; We Are Vivo Consult Comprehensive Dust Solution; Jul. 11, 2017.

Savic, Sasha, et al. "High Fogging Application for Alston Gas Turbines," Technical Paper presented at PowerGen International, Orlando USA, Nov. 12-14, 2013.

Chaker, Mustapha, et al."Inlet Fogging of Gas Turbine Engines: Climatic Analysis of Gas Turbine Evaporative Cooling Potential of International Locations," Proceedings of ASME Turbo Expo, Jun. 3-6, 2002.

Kaveri, Dry Fog Dust Suppression System, retrieved from http://kaveri.in/pdfs/dfdss.pdf, May 27, 2018.

Dry Fog Systems, retrieved from: https://www.nodust.com/Other/dry-fog-agglomerative-dust-suppression-systems-by-dust-solutions-inc.html, retrieved on May 27, 2018.

Mee Industries Inc., "Gas Turbine Cooling," retrieved on http://www.meefog.com/fog-evaporative-cooling/gas-turbine-cooling, retrieved on May 27, 2018.

* cited by examiner

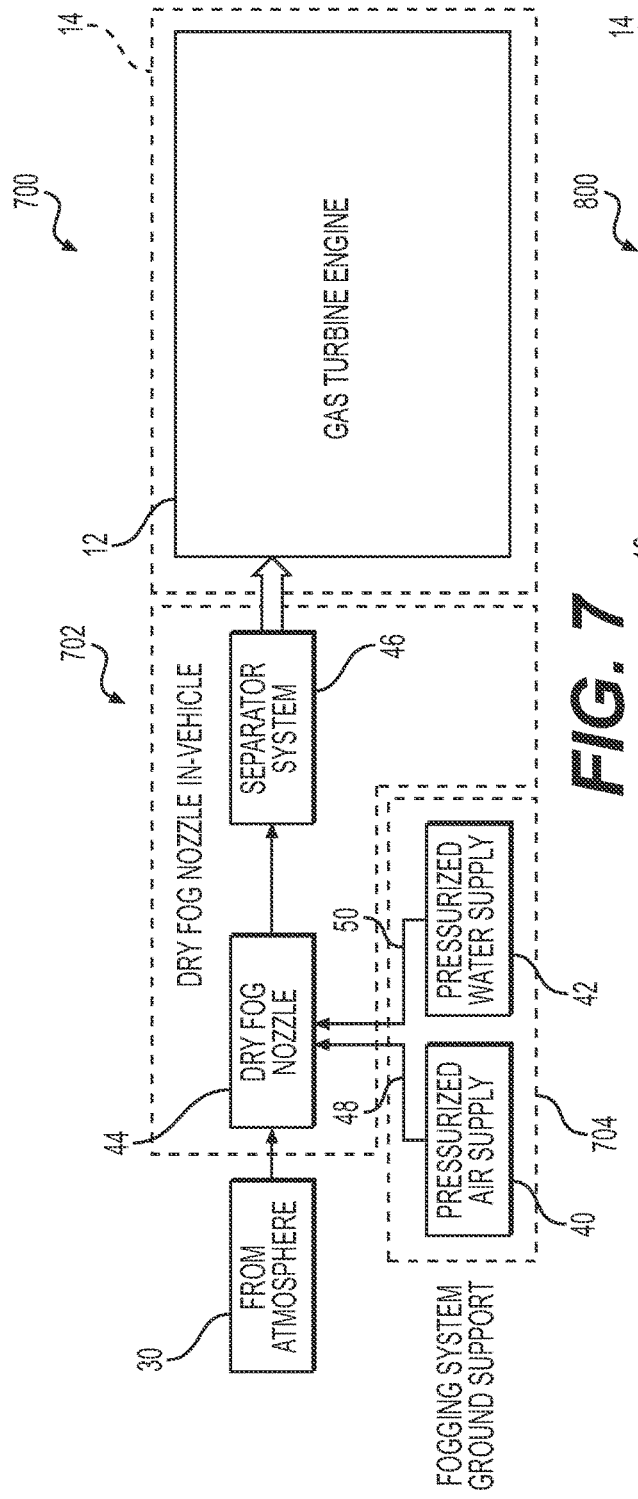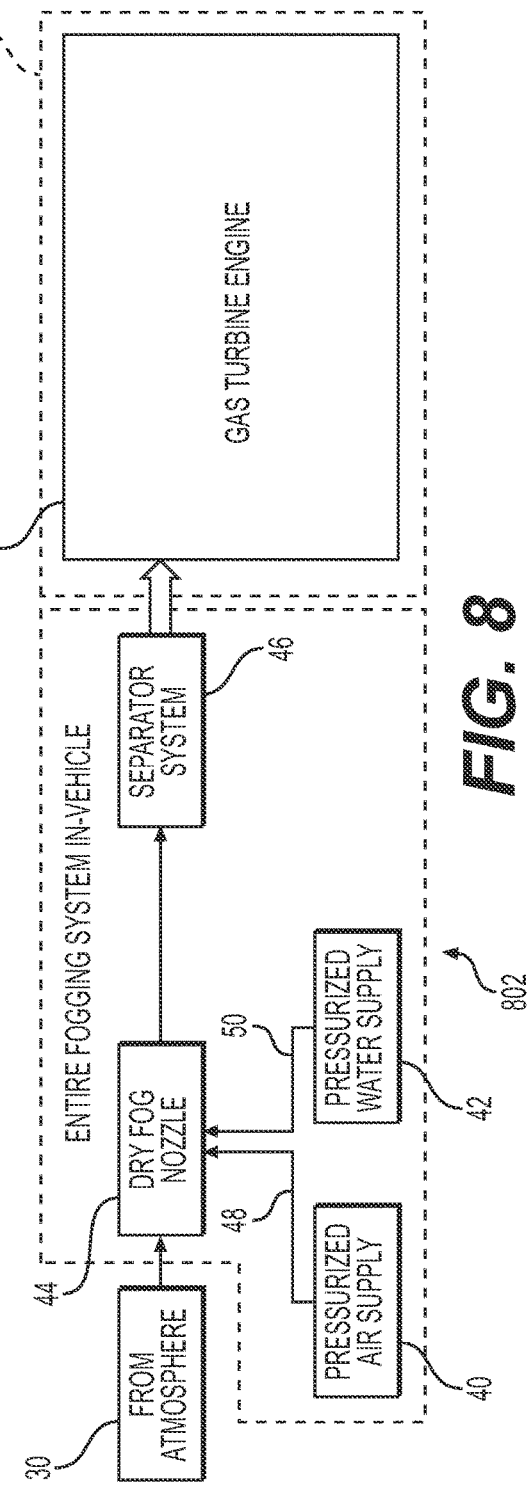

SYSTEMS AND METHODS FOR DRY FOG INLET PARTICLE SEPARATOR

TECHNICAL FIELD

The present disclosure generally relates to gas turbine engines, and more particularly relates to systems and methods for a dry fog inlet particle separator for a gas turbine engine.

BACKGROUND

Gas turbine engines may be employed to power various devices. For example, a gas turbine engine may be employed to power a vehicle, such as an aircraft. In the example of the gas turbine engine powering a mobile platform, during the operation of the gas turbine engine, air from the atmosphere is pulled into the gas turbine engine and used to generate energy to propel the vehicle. In certain operating environments, such as desert operating environments, the air in the atmosphere may contain fine sand and dust particles, which may be less than about 10 micrometers in size. Due to the small particle size of the fine sand and dust particles, these particles tend to follow the airflow through the gas turbine engine, and may be ingested by the turbine. The ingestion of the fine sand and dust particles may accumulate in cooling circuits associated with the turbine, which may reduce a cooling effectiveness of the turbine.

Accordingly, it is desirable to provide an inlet particle separator, which separates fine sand and dust particles from the air from the atmosphere that is drawn into the gas turbine engine. In this regard, it is desirable to provide a dry fog inlet particle separator, in which dry fog is used to separate the fine sand and dust particles from the air that is drawn into the gas turbine engine, thereby reducing an amount of fine sand and dust particles ingested by the gas turbine engine. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is an inlet particle separator system for a gas turbine engine. The inlet particle separator system includes a separator manifold. The separator manifold includes a manifold inlet upstream from a manifold outlet. The manifold inlet is configured to receive an incoming airflow, and the manifold outlet is configured to be fluidly coupled to an inlet of the gas turbine engine to direct the incoming airflow into the inlet. The inlet particle separator system includes at least one dry fog nozzle coupled proximate the manifold inlet so as to face at least partially away from the manifold inlet. The at least one dry fog nozzle is external to the separator manifold, and the at least one dry fog nozzle is configured to direct a spray of dry fog in a direction transverse to the incoming airflow to agglomerate with fine particles in the incoming airflow to form agglomerated particles. The inlet particle separator system includes a scavenging system coupled to the separator manifold downstream from the manifold inlet, and the scavenging system removes the agglomerated particles from the separator manifold.

A bellmouth is defined at the manifold inlet. The separator manifold includes a second manifold outlet, and the second manifold outlet is downstream from the manifold outlet and separated from the manifold outlet by a splitter. The scavenging system is fluidly coupled to the second manifold outlet and is configured to exhaust the agglomerated particles through the second manifold outlet. The separator manifold defines a tortuous path between the manifold inlet and the manifold outlet. The inlet particle separator system further includes at least one sealing member coupled to the separator manifold proximate the manifold outlet that is configured to form a seal against the inlet of the gas turbine engine. The gas turbine engine is associated with a vehicle and the separator manifold is removably coupled to the inlet of the gas turbine engine. The inlet particle separator system further includes a pressurized water supply fluidly coupled to the at least one dry fog nozzle and a pressurized air supply fluidly coupled to the at least one dry fog nozzle. The gas turbine engine is associated with a vehicle, the pressurized water supply and the pressurized air supply are a ground-based system, and the at least one dry fog nozzle, the separator manifold and the scavenging system are a vehicle-based system onboard the vehicle. The gas turbine engine is associated with a vehicle, and the pressurized water supply, the pressurized air supply, the at least one dry fog nozzle, the separator manifold and the scavenging system are a vehicle-based system onboard the vehicle.

Also provided according to various embodiments is a method of providing a clean airflow to an inlet of a gas turbine engine. The method includes fluidly coupling a separator manifold including at least one dry fog nozzle to an inlet duct of a vehicle such that a manifold outlet of the separator manifold is fluidly coupled to the inlet duct, with the at least one dry fog nozzle positioned external to a manifold inlet of the manifold and the manifold inlet upstream from the manifold outlet. The method includes outputting a spray of dry fog by the at least one dry fog nozzle in a direction transverse to an incoming airflow into the manifold inlet to agglomerate with fine particles in the airflow to form agglomerated particles, and separating the agglomerated particles from the incoming airflow. The method includes exhausting the agglomerated particles though a second manifold outlet with a scavenging system.

The method of further includes fluidly coupling a pressurized water supply to the at least one dry fog nozzle to supply the at least one dry fog nozzle with pressurized water; and fluidly coupling a pressurized air supply to the at least one dry fog nozzle to supply the at least one dry fog nozzle with pressurized air, with the at least one dry fog nozzle outputting the spray of dry fog based on the receipt of the pressurized water and the pressurized air. The separating the agglomerated particles from the airflow further includes: separating the agglomerated particles from the airflow with a tortuous path defined between the manifold inlet and the manifold outlet. The method further includes increasing a velocity of the airflow through the manifold inlet by a bellmouth defined at the manifold inlet.

Further provided is an inlet particle separator system for a gas turbine engine. The inlet particle separator system includes a separator manifold. The separator manifold includes a manifold inlet upstream from a manifold outlet. The manifold inlet is configured to receive an incoming airflow, and the manifold outlet is configured to be fluidly coupled to an inlet of the gas turbine engine to direct the incoming airflow into the inlet. The separator manifold defines a tortuous path from the manifold inlet to the manifold outlet. The inlet particle separator system includes at least one dry fog nozzle coupled proximate the manifold inlet so as to face at least partially away from the manifold inlet. The at least one dry fog nozzle is external to the separator manifold, and the at least one dry fog nozzle is configured to direct a spray of dry fog in a direction transverse to the incoming airflow to agglomerate with fine particles in the incoming airflow to form agglomerated particles. The inlet particle separator system includes a scavenging system coupled to the separator manifold downstream from the manifold inlet, and the scavenging system removes the agglomerated particles from the separator manifold.

The separator manifold includes a second manifold outlet. The second manifold outlet is downstream from the manifold outlet and separated from the manifold outlet by a splitter. The scavenging system is fluidly coupled to the second manifold outlet and is configured to exhaust the agglomerated particles through the second manifold outlet. A bellmouth is defined at the manifold inlet. The inlet particle separator system further includes a pressurized water supply fluidly coupled to the at least one dry fog nozzle and a pressurized air supply fluidly coupled to the at least one dry fog nozzle. The gas turbine engine is associated with a vehicle. The pressurized water supply and the pressurized air supply are a ground-based system, and the at least one dry fog nozzle, the separator manifold and the scavenging system are a vehicle-based system onboard the vehicle. The gas turbine engine is associated with a vehicle and the separator manifold is removably coupled to the inlet of the gas turbine engine.

DESCRIPTION OF THE DRAWINGS

The exemplary embodiments will hereinafter be described in conjunction with the following drawing figures, wherein like numerals denote like elements, and wherein:

FIG. 7 is a functional block diagram of a dry fog inlet particle separator system for use with an exemplary gas turbine engine in which a portion of the dry fog inlet particle separator system is a vehicle-based system and a portion of the dry fog inlet particle separator system is a ground-based system; and FIG. 8 is a functional block diagram of a dry fog inlet particle separator system for use with an exemplary gas turbine engine in which the dry fog inlet particle separator system is a vehicle-based system.

DETAILED DESCRIPTION

Figure 1:
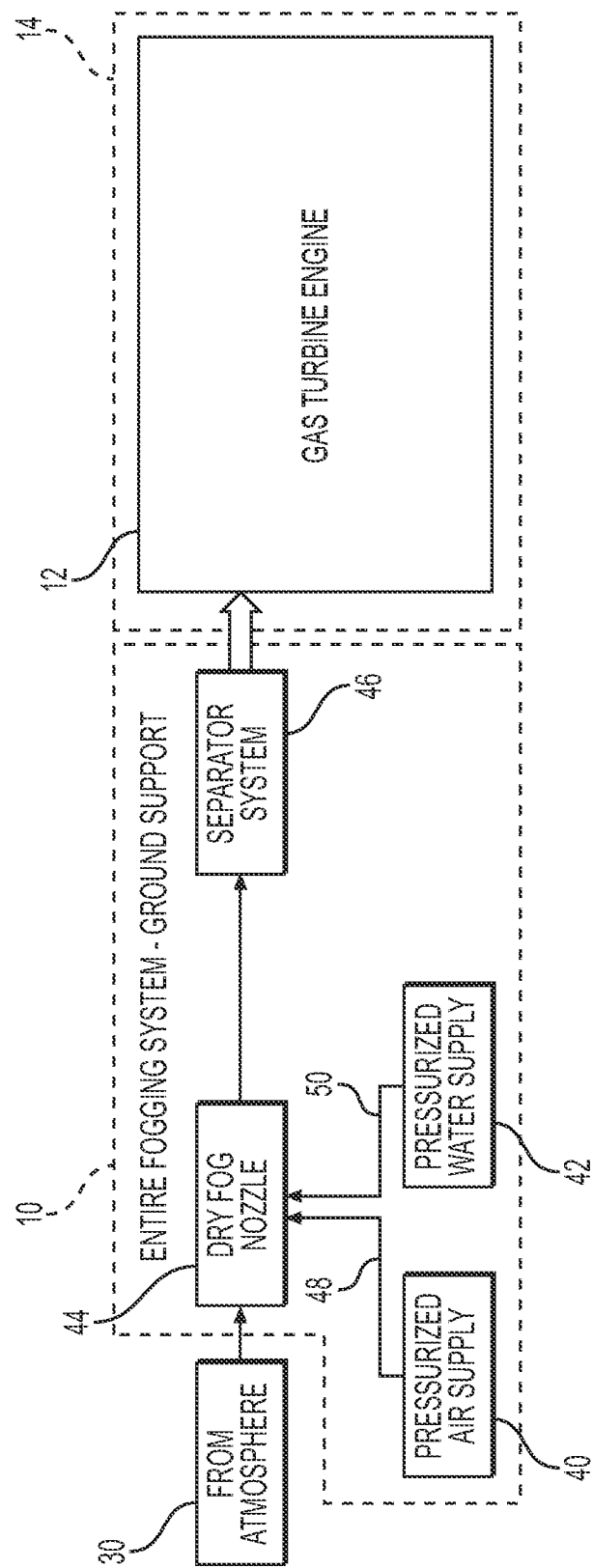
FIG. 1 is a functional block diagram of a dry fog inlet particle separator system for use with an exemplary gas turbine engine.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of internal combustion engine that would benefit from having an inlet particle separator that reduces the ingestion of fine sand and dust particles, and the dry fog inlet particle separator system described herein for a gas turbine engine is merely one exemplary embodiment according to the present disclosure. In addition, while the dry fog inlet particle separator system is described herein as being used with a gas turbine engine onboard a vehicle, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

With reference to FIG. 1, a functional block diagram of a dry fog inlet particle separator system 10 for use with a gas turbine engine 12 is shown. In one example, the gas turbine engine 12 is an auxiliary power unit (APU), which is employed with a vehicle 14, such as an aircraft. It should be noted that while the dry fog inlet particle separator system 10 is discussed herein with regard to the gas turbine engine 12 in the form of an APU, the dry fog inlet particle separator system 10 may be employed with any suitable engine, such as a turbojet engine, etc. Thus, the following description is merely one exemplary use of the dry fog inlet particle separator system 10.

Figure 2:
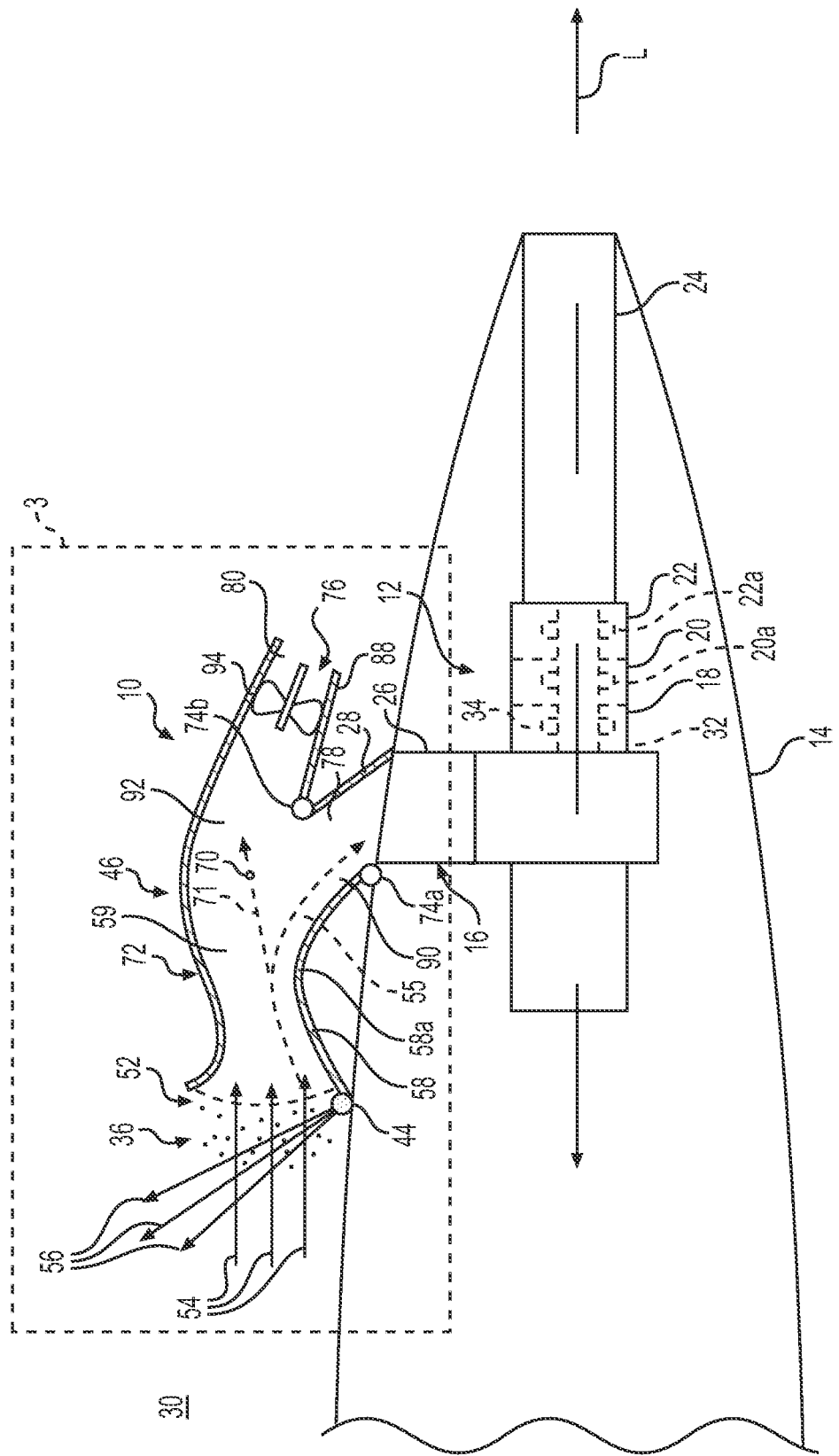
FIG. 2 is an environmental view of the dry fog inlet particle separator system of FIG. 1 coupled to a vehicle and fluidly coupled to the gas turbine engine associated with the vehicle.

In one example, with reference to FIG. 2, the gas turbine engine 12 includes an intake section 16, a compressor section 18, a combustor section 20, a turbine section 22, and an exhaust section 24. The intake section 16 includes an inlet duct 26 having an inlet door 28. The inlet door 28 is movable between an opened position to receive air from a source 30, such as the atmosphere or environment external to the vehicle 14, and a closed position by an actuator, for example. A shaft 32 defines an axis of rotation for the gas turbine engine 12, which also comprises a longitudinal axis L of the gas turbine engine 12.

The compressor section 18 includes a compressor 34, which is coupled to the shaft 32. However, in other embodiments, the number of compressors in the compressor section 18 may vary. In the depicted embodiment, the rotation of the shaft 32 drives the compressor 34, which draws in air from the inlet duct 26 of the intake section 16. The compressor 34 raises the pressure of the air and directs majority of the high pressure air into the combustor section 20.

The combustor section 20 includes an annular combustor 20a, which receives the compressed air from the compressor, and also receives a flow of fuel from a non-illustrated fuel source via a fuel metering valve (not shown). The fuel and compressed air are mixed within the combustor, and are combusted to produce relatively high-energy combustion gas. The relatively high-energy combustion gas that is generated in the combustor is supplied to the turbine section 22.

The turbine section 22 includes a turbine 22a. However, it will be appreciated that the number of turbines, and/or the configurations thereof, may vary. In this embodiment, the high-energy combustion gas from the combustor section 20 expands through and rotates the turbine 22a of the turbine section 22. The air is then exhausted through the exhaust section 24. As the turbine rotates, it drives equipment coupled to the gas turbine engine 12 via a shaft or spool. As will be discussed, the dry fog inlet particle separator system 10 separates fine sand and dust particles, generally indicated by reference numeral 36, from the air provided by the source 30 such that the airflow entering the inlet duct 26 is substantially devoid of the fine sand and dust particles. In this example, the dry fog inlet particle separator system 10 is capable of removing fine particles having a particle size of 10 micrometers or less from the air provided by the source 30. Thus, as used herein, "fine particle" denotes a particle of fine sand, dust or other debris having an average particle size of 10 micrometers or less. By removing the fine particles from the air provided by the source 30, the fine particles are not ingested by the compressor 34 of the compressor section 18, which prolongs the operating life of the compressor 34, combustor 20a and turbine 22a; and reduces downtime of the gas turbine engine 12 associated with the repair and/or replacement of the compressor 34, combustor 20a and turbine 22a. Further, the removal of the fine particles from the air provided by the source 30 also reduces or inhibits the accumulation of the fine particles within the cooling circuits associated with the turbine 22a.

In one example, with reference back to FIG. 1, the dry fog inlet particle separator system 10 includes a pressurized air supply 40, a pressurized water supply 42, at least one dry fog nozzle 44 and a separator system 46. In this example, the dry fog inlet particle separator system 10 is a ground support system, which may be removably coupled to the gas turbine engine 12 and the vehicle 14. For example, the dry fog inlet particle separator system 10 may be coupled to the gas turbine engine 12 while the vehicle 14 is on the ground, and may be removed prior to a flight or movement of the vehicle 14. In addition, it should be noted that other particle separator systems, for removing larger sized particles, for example, may be used in conjunction with the dry fog inlet particle separator system 10.

The pressurized air supply 40 provides compressed air to the dry fog nozzle 44 via at least one conduit 48 fluidly coupled between the pressurized air supply 40 and the dry fog nozzle 44. In one example, the pressurized air supply 40 is supplied by a compressor fluidly coupled to the dry fog nozzle 44, which draws in air from the atmosphere or air external to the vehicle 14, and pressurizes the air for use by the dry fog nozzle 44. In other embodiments, the pressurized air supply 40 is a tank of compressed air, which is fluidly coupled to the dry fog nozzle 44. The pressurized air supply 40 is fluidly coupled to the dry fog nozzle 44 to provide pressurized air at about 30 pounds per square inch (psi) to about 100 pounds per square inch (psi). The conduit 48, includes, but is not limited to, pipes, flexible pneumatic hoses, etc. The conduit 48 may include one more quick disconnect couplings or other fittings to fluidly couple the conduit 48 to the dry fog nozzle 44.

The pressurized water supply 42 provides pressurized water to the dry fog nozzle 44 via at least one conduit 50 fluidly coupled between the pressurized water supply 42 and the dry fog nozzle 44. In one example, the pressurized water supply 42 includes a pump fluidly coupled to the dry fog nozzle 44, which draws in water from an associated water tank, and pressurizes the water for use by the dry fog nozzle 44. In other embodiments, the pressurized water supply 42 is a pressure tank that holds water under pressure, which is fluidly coupled to the dry fog nozzle 44. The pressurized water supply 42 is fluidly coupled to the dry fog nozzle 44 to provide pressurized water at about 30 pounds per square inch (psi) to about 50 pounds per square inch (psi). The conduit 50, includes, but is not limited to, pipes, flexible hoses, etc. The conduit 50 may include one more quick disconnect couplings or other fittings to fluidly couple the conduit 50 to the dry fog nozzle 44.

The dry fog nozzle 44 is in fluid communication with the pressurized air supply 40 and the pressurized water supply 42 to receive the pressurized air and pressurized water, respectively. Based on the receipt of the pressurized air and the pressurized water, the dry fog nozzle 44 generates a spray of dry fog 56, which agglomerates to the fine particles to create agglomerated particles that are separated out by the separator system 46 such that a substantially clean airflow 55 (FIG. 2) enters into the gas turbine engine 12. A "substantially clean airflow" denotes air entering into the inlet duct 26 (FIG. 2) of the gas turbine engine 12 that contains 50% or less of fine particles as compared to an untreated airflow or air disposed upstream from the dry fog nozzle 44. In one example, the dry fog nozzle 44 comprises a commercially available dry fog nozzle that is capable of creating dry fog droplets of about 1.0 to about 10 micrometers. Generally, with reference to FIG. 3, the dry fog nozzle 44 outputs the spray of dry fog 56 in a direction transverse to the airflow 54.

Generally, the spray of dry fog 56 is output by the dry fog nozzle 44 so as to substantially cover the inlet 52 of the separator system 46, but is not directed into or at a manifold inlet or an inlet 52 of the separator system 46 to reduce or eliminate the entry of dry fog into the inlet 52 and/or the gas turbine engine 12. Thus, generally, the dry fog nozzle 44 faces away from the inlet 52 and the separator system 46. The spray of dry fog 56 output by the dry fog nozzle 44 substantially covers the inlet 52 where the air velocity of the airflow 54 is low. By facing the dry fog nozzle 44 away from the inlet 52, the dry fog is sprayed into the lower velocity airflow 54, which ensures good coverage of the dry fog across the plane of the inlet 52. If the dry fog was sprayed downstream of the inlet 52, for example, within a separator manifold 72 associated with the separator system 46, the accelerated velocity of the air within the separator system 46 would not let the spray of dry fog 56 penetrate across the separator manifold 72, but rather, the dry fog would remain near the wall of the separator manifold 72, thereby substantially reducing the agglomeration of fine particles. Generally, the agglomeration of the fine particles is maximized when the spray of dry fog 56 is output by the dry fog nozzle 44 just proximate the inlet 52.

Figure 4:
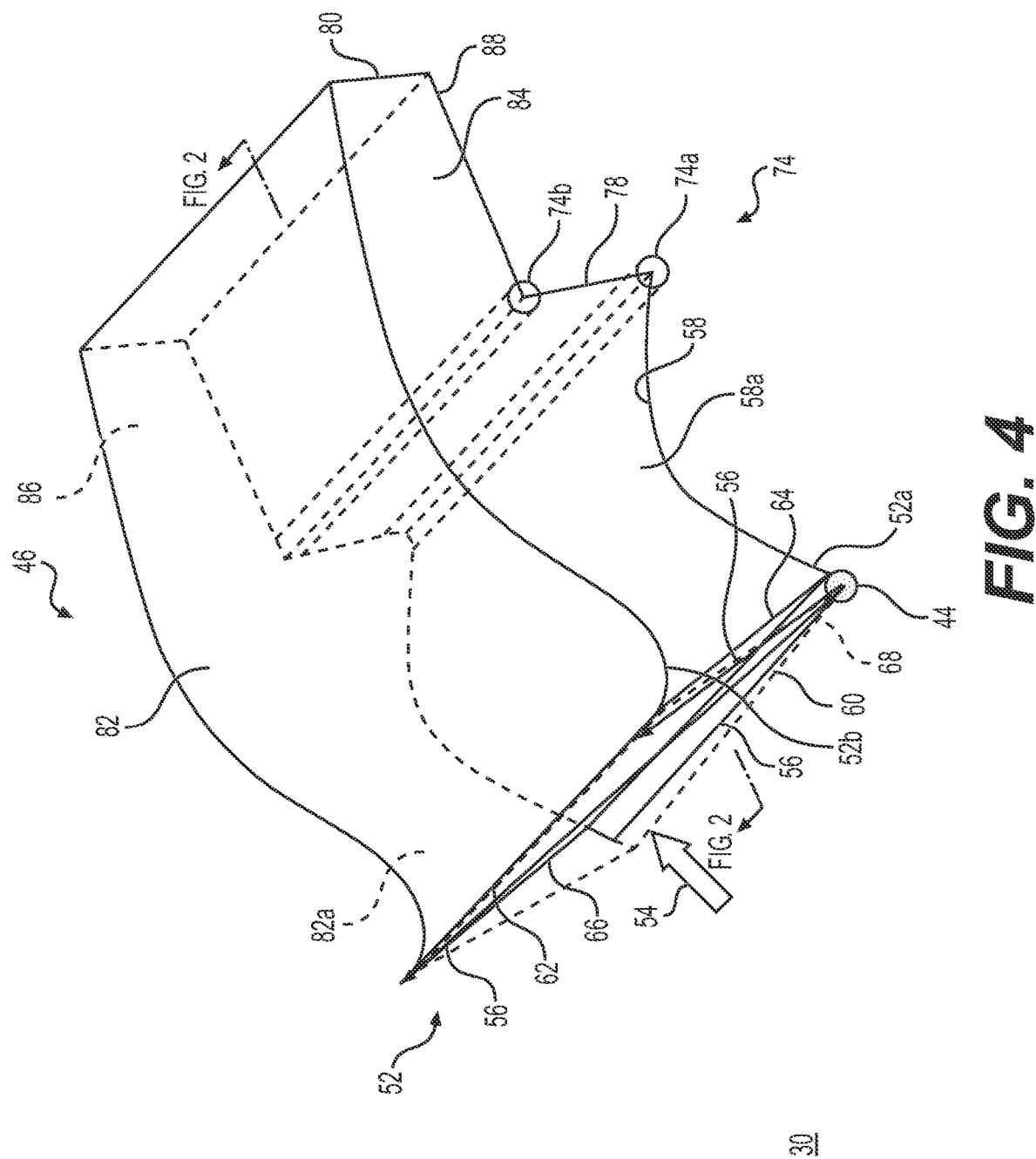
FIG. 4 is a perspective view of a separator manifold of the dry fog inlet particle separator of FIG. 1.

In one example, the dry fog nozzle 44 is coupled proximate the inlet 52 of the separator system 46. Generally, the dry fog nozzle 44 is coupled proximate the inlet 52 so as to be disposed externally of the inlet 52. Stated another way, the dry fog nozzle 44 is upstream from the inlet 52 in the direction of the airflow 54 from the source 30 into the inlet 52. The dry fog nozzle 44 is located just upstream of the inlet 52, however, it should be noted that the dry fog nozzle 44 may be located anywhere around the edges of inlet 52 so as to be upstream of the inlet 52. With reference to FIG. 4, in one example, the dry fog nozzle 44 is proximate the inlet 52 to output the spray of dry fog 56 that substantially covers the inlet 52 from a first end 60 of the inlet 52 to an opposite, second end 62 of the inlet 52, and from a first side 64 of the inlet 52 to an opposite, second side 66 of the inlet 52. Thus, the dry fog nozzle 44 is positioned proximate the inlet 52 to output the spray of dry fog 56 to provide a full coverage of dry fog (generally identified with reference numeral 68) proximate the inlet 52. In other embodiments, a plurality of dry fog nozzles 44 may be used to output dry fog to cover the inlet 52, which may be arranged in a line or staggered relative to each other to create multiple locations of dry fog. By substantially covering an area proximate the inlet 52 with dry fog, the dry fog nozzle 44 ensures that the airflow 54 encounters dry fog prior to entering the inlet 52.

Figure 3:
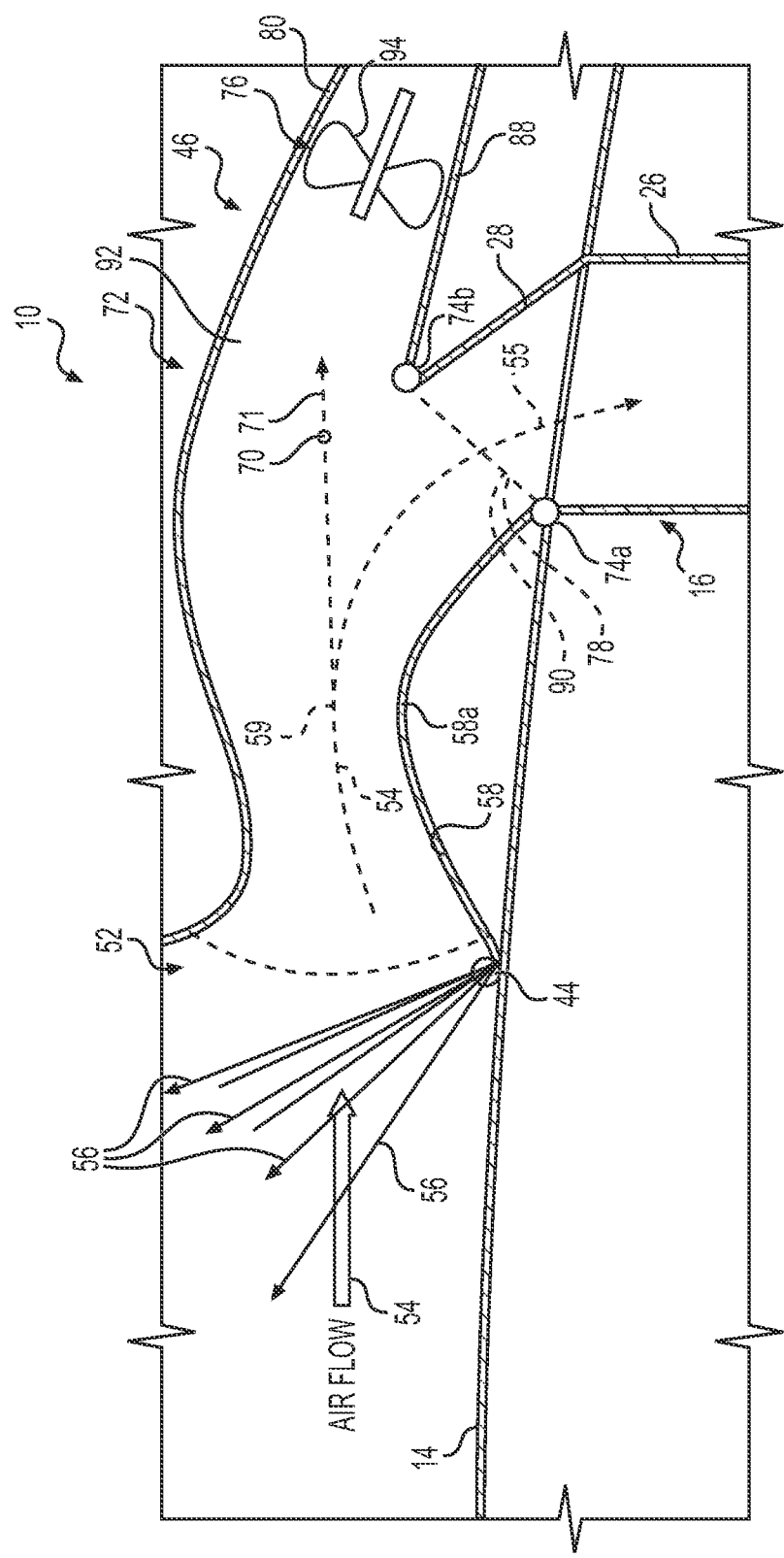
FIG. 3 is a detail view of the dry fog inlet particle separator system taken at 3 of FIG. 2.
Figure 5:
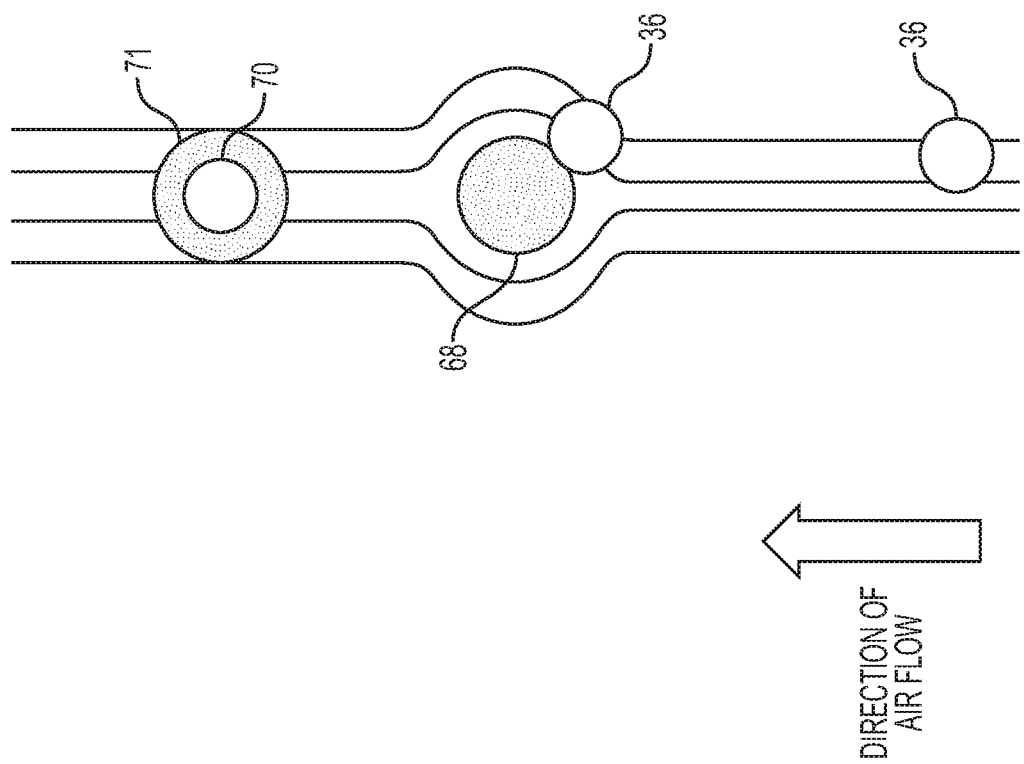
FIG. 5 is an environmental view of a fine particle in an airflow impacting and agglomerating with a dry fog droplet to form an agglomerated particle.

As the airflow 54 encounters the dry fog created by the spray of dry fog 56 output by the dry fog nozzle 44, with reference to FIG. 5, the fine particles 36 impact and agglomerate with dry fog droplets 68 in the spray of dry fog 56 to form agglomerated particles 70. The agglomerated particles 70 may be considered to be entrained within an agglomerated particle airflow 71, which is separable from the clean airflow 55 (FIG. 3). The agglomerated particles 70 have a particle mass that is greater than a particle mass of the fine particles 36, which enables the agglomerated particles 70 to be separated from the airflow 54 within the separator system 46, as will be discussed. In one example, the particle mass may be increased from about 130% to about 400% when the fine particles are agglomerated with the dry fog. In addition, the agglomerated particles 70 have a particle size of about 13 micrometers, which is greater than the particle size of the fine particles 36.

With reference back to FIGS. 3 and 4, the separator system 46 is shown. The separator system 46 includes the separator manifold 72, at least two sealing members 74 and a scavenging system 76. The separator manifold 72 is a housing, which defines the inlet 52, a manifold outlet or first outlet 78 and a second manifold outlet or second outlet 80. The dry fog nozzle 44 may be coupled to the separator manifold 72 by a strut, a bracket, a flange, a portion of the housing that defines the separator manifold 72, mechanical fasteners, etc., so as to be positioned outside of the inlet 52, but proximate the inlet 52 and upstream of the inlet 52. The separator manifold 72 may be composed of a suitable material, including, but not limited to a metal, metal alloy or polymer based material. The separator manifold 72 may be cast, stamped, forged, formed through additive manufacturing, formed through composite ply lay-up, etc. In one example, the inlet 52 includes a first bellmouth 52*a* defined at the first end 60, and a second bellmouth 52*b* defined at the second end 62. The bellmouths 52*a*, 52*b* cooperate to draw the airflow 54 into the separator manifold 72. The separator manifold 72 includes a second sidewall 82 that interconnects the inlet 52 and the second outlet 80, and the sidewall 58 that interconnects the inlet 52 and the first outlet 78. In one example, the second sidewall 82 includes a convex curve 82*a* proximate the inlet 52, and the sidewall 58 includes a convex curve 58*a* proximate the inlet 52. The convex curve 58*a* of the sidewall 58 creates a tortuous path 59 for the flow of air from the inlet 52 of the separator manifold 72 to the first outlet 78 and into the inlet duct 26. The tortuous path 59 is defined in the separator manifold 72 from the inlet 52 to the first outlet 78. A third sidewall 84 interconnects the sidewall 58 and the second sidewall 82 on a first side of the separator manifold 72, and a fourth sidewall 86 interconnects the sidewall 58 and the second sidewall 82 on an opposed side of the separator manifold 72. A fifth sidewall 88 is coupled between the sidewall 58 and the second sidewall 82 downstream of the first outlet 78 to define the second outlet 80.

With reference to FIG. 3, the fifth sidewall 88 acts as a splitter to divide the separator manifold 72 into a first, clean flow passage 90 and a second, scavenging flow passage 92. The first, clean flow passage 90 is defined from the fifth sidewall 88 to the first outlet 78, and a second, scavenging flow passage 92 from the fifth sidewall 88 to the second outlet 80. The first, clean flow passage 90 is defined along the tortuous path 59. The first outlet 78 is downstream from the inlet 52 and is in fluid communication with the inlet duct 26 of the gas turbine engine 12. The substantially clean airflow 55 enters the first outlet 78 and flows into the inlet duct 26. The second outlet 80 is downstream from the inlet 52 and the first outlet 78, and is in fluid communication with the scavenging system 76.

Generally, the two sealing members 74 create a seal between the separator manifold 72 and the inlet door 28. In one example, the sealing members 74 are composed of a polymer-based material, such as a rubber, silicone, etc., and may be molded, extruded, etc. With reference back to FIG. 4, in one example, one of the sealing members 74*a* is coupled to the sidewall 58 at the first outlet 78 to extend along a length of the sidewall 58, and one of the sealing members 74*b* is coupled to the fifth sidewall 88 at the first outlet 78 to extend along a length of the fifth sidewall 88. Thus, in this example, the sealing members 74 comprise strips that may compress, for example, to provide an air-tight seal or substantially air-tight seal between the separator manifold 72 and the vehicle 14 (via the sealing member 74*a*) and between the separator manifold 72 and the inlet door 28 (via the sealing member 74*b*).

With reference to FIG. 3, the scavenging system 76 is fluidly coupled to the second, scavenging flow passage 92 and the second outlet 80. In one example, the scavenging system 76 includes a fan 94, which is coupled to the separator manifold 72 downstream form the inlet 52 and upstream from the second outlet 80. The fan 94 is any suitable fan having one or more rotatable blades capable of drawing the agglomerated particles in the agglomerated particle airflow 71 into the second, scavenging flow passage 92. The fan 94 is coupled to a power supply, such as a battery pack, an alternating current (AC) supply, etc., which supplies a motor of the fan 94 with current to drive the rotatable blades. The fan 94 draws the agglomerated particles 70 in the agglomerated particle airflow 71 into the second, scavenging flow passage 92 to be exhausted by the fan 94 into an environment surrounding the vehicle 14, for example. In other embodiments, the agglomerated particles 70 in the agglomerated particle airflow 71 may be contained within a collector, for example, for later disposal. In addition, in other embodiments, the second, scavenging flow passage 92 may be transition to a circular duct that houses the fan 94. Thus, the example of the second, scavenging flow passage 92 in FIG. 3 is merely an example, as the second, scavenging flow passage 92 may include a circular or curved duct proximate the second outlet 80, which houses the fan 92.

Figure 6:
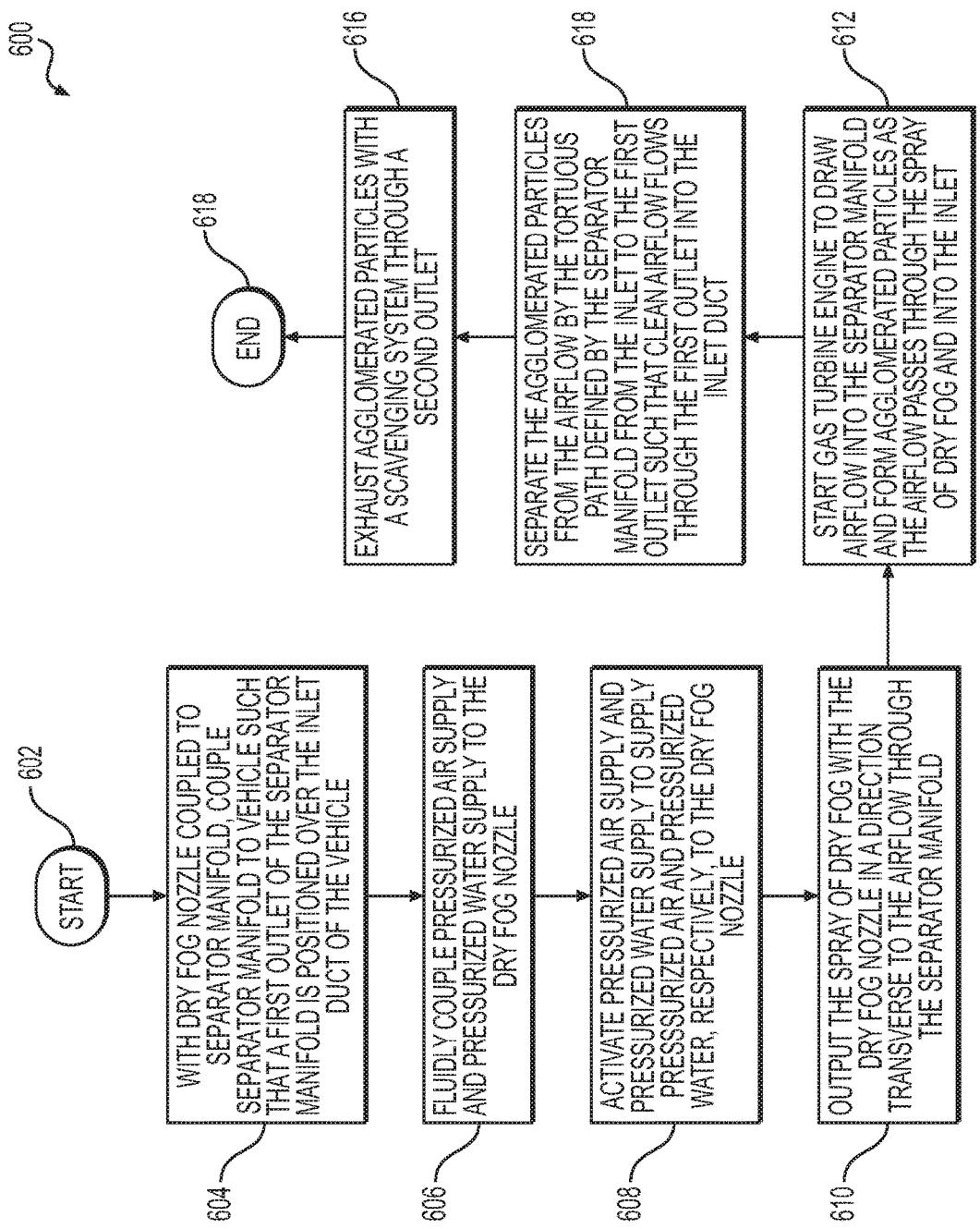
FIG. 6 is an exemplary method for using the dry fog inlet particle separator system of FIG. 1 to generate a clean airflow for the gas turbine engine.

In one example, with reference to FIG. 2 and additional reference to FIG. 6, a flowchart illustrates a method 600 that can be performed to provide clean airflow 55 to the gas turbine engine 12 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure.

The method begins at 602. At block 604, in order to employ the dry fog inlet particle separator system 10 to provide clean airflow 55 to the gas turbine engine 12, with the separator manifold 72 formed, the sealing members 74a, 74b are coupled to the separator manifold 72 (FIG. 2). The dry fog nozzle 44 is coupled to the separator manifold 72 so as to be proximate, but upstream of the inlet 52 (FIG. 2). The dry fog nozzle 44 is orientated to face away from the inlet 52. With the inlet door 28 opened, the separator manifold 72 is positioned over the intake section 16 such that the inlet duct 26 is fluidly coupled to the first outlet 78 and the sealing members 74a, 74b form the air-tight seal between the separator manifold 72, the vehicle 14 and the inlet door 28. With the separator manifold 72 coupled to the vehicle 14, at 606, the pressurized air supply 40 is fluidly coupled to the dry fog nozzle 44, via the conduit 48, and the pressurized water supply 42 is fluidly coupled to the dry fog nozzle 44, via the conduit 50. At 608, the pressurized air supply 40 and the pressurized water supply 42 may be activated, via an operator for example, to supply the pressurized air and the pressurized water to the dry fog nozzle 44. Based on the receipt of the pressurized air and the pressurized water, at 610, the dry fog nozzle 44 generates and outputs the spray of dry fog 56 in a direction transverse to the airflow 54 through the separator manifold 72 and so as to substantially cover the inlet 52.

At 612, the gas turbine engine 12 may be started, by an operator through a controller associated with the gas turbine engine 12 for example, which causes the gas turbine engine 12, via the compressor 34 of the compressor section 18 to draw the airflow 54 into the separator manifold 72. As the airflow 54 flows through the spray of dry fog 56 output by the dry fog nozzle 44, the fine particles 36 impact and agglomerate with the dry fog droplets 68 (FIG. 5) and form the agglomerated particles 70. As each agglomerated particle 70 is composed of both a respective fine particle 36 and dry fog droplet 68 (FIG. 5), the agglomerated particle 70 has the particle mass that is greater than the particle mass of the fine particle 36. As the airflow 54 flows past the inlet 52, the velocity of the airflow 54 increases due to the bellmouths 52*a*, 52*b* and the proximity of the compressor 34. At 614, as the airflow 54 flows along the tortuous path 59 defined by the sidewall 58, the inertia of the agglomerated particles 70 causes the agglomerated particles 70 to flow into the second, scavenging flow passage 92 as the mass of the agglomerated particles 70 inhibits the agglomerated particles 70 from turning along the tortuous path 59 into the first, clean flow passage 90. Thus, at 616, the separator manifold 72 and the dry fog nozzle 44 cooperates to ensure that substantially clean airflow 55 enters into the inlet duct 26, while the agglomerated particle airflow 71 flows into the second, scavenging flow passage 92 for exhausting through the second outlet 80 into the environment surrounding the vehicle 14. Substantially simultaneously with or immediately prior to the starting of the gas turbine engine 12, the fan 94 may be activated, by an operator for example, to assist in drawing the agglomerated particles 70 in the agglomerated particle airflow 71 into the second, scavenging flow passage 92 and exhausting the agglomerated particles 70 through the second outlet 80. The method may end at 618, which may be after a period of time of operation of the gas turbine engine 12, prior to a departure, take-off or movement of the vehicle 14, etc.

It should be noted that in other embodiments, the dry fog inlet particle separator system 10 may be configured differently to provide clean airflow for the gas turbine engine 12. For example, with reference to FIG. 7, a dry fog inlet particle separator system 700 is shown. As the dry fog inlet particle separator system 700 includes components that are the same or similar to components of the dry fog inlet particle separator system 10 discussed with regard to FIGS. 1-6, the same reference numerals will be used to denote the same or similar components.

In the example of FIG. 7, the dry fog inlet particle separator system 700 includes the pressurized air supply 40, the pressurized water supply 42, the at least one dry fog nozzle 44 and the separator system 46, which includes the separator manifold 72, the sealing members 74 and the scavenging system 76. In this example, the dry fog nozzle 44 and the separator system 46 are not removably coupled to the vehicle 14 as discussed with regard to the dry fog inlet particle separator system 10 of FIGS. 1-6. Rather, the dry fog nozzle 44 and the separator system 46 are coupled to the gas turbine engine 12 so as to remain with the vehicle 14 during operation (including flight) of the vehicle 14 so as to form a vehicle-based system 702 onboard the vehicle 14. Thus, in this example, the dry fog nozzle 44, the separator system 46 and the gas turbine engine 12 are coupled to the vehicle 14, while the pressurized air supply 40 and the pressurized water supply 42 are a ground-based system 704. Thus, upon landing or while the vehicle 14 is on the ground, the pressurized air supply 40 and the pressurized water supply 42 may be coupled to the dry fog nozzle 44 of the vehicle 14 to provide the substantially clean airflow into the gas turbine engine 12 as discussed with regard to FIGS. 1-6.

It should be noted that in still other embodiments, the dry fog inlet particle separator system 10 may be configured differently to provide clean airflow for the gas turbine engine 12. For example, with reference to FIG. 8, a dry fog inlet particle separator system 800 is shown. As the dry fog inlet particle separator system 800 includes components that are the same or similar to components of the dry fog inlet particle separator system 10 discussed with regard to FIGS. 1-6, the same reference numerals will be used to denote the same or similar components.

In the example of FIG. 8, the dry fog inlet particle separator system 800 includes the pressurized air supply 40, the pressurized water supply 42, the at least one dry fog nozzle 44 and the separator system 46, which includes the separator manifold 72, the sealing members 74 and the scavenging system 76. In this example, the pressurized air supply 40, the pressurized water supply 42, the dry fog nozzle 44 and the separator system 46 are not removably coupled to the vehicle 14 as discussed with regard to the dry fog inlet particle separator system 10 of FIGS. 1-6. Rather, the pressurized air supply 40, the pressurized water supply 42, the dry fog nozzle 44 and the separator system 46 are coupled to the gas turbine engine 12 so as to remain with the vehicle 14 during operation (including flight) of the vehicle 14 so as to form a vehicle-based system 802 onboard the vehicle 14. Thus, in this example, the pressurized air supply 40, the pressurized water supply 42, the dry fog nozzle 44, the separator system 46 and the gas turbine engine 12 are coupled to the vehicle 14. Thus, during operation of the vehicle 14, the dry fog inlet particle separator system 800 may provide the substantially clean airflow into the gas turbine engine 12 as discussed with regard to FIGS. 1-6.

Thus, with reference to FIG. 2, the dry fog inlet particle separator system 10, 700, 800 removes fine particles 36 (FIG. 5) from the airflow 54 into the separator manifold 72, and thus, the gas turbine engine 12, by the output of the spray of dry fog 56 and the tortuous path 59 defined through the separator manifold 72 to the first outlet 78. By removing the fine particles and producing the clean airflow 55, the dry fog inlet particle separator system 10, 700, 800 reduces the amount of fine particles ingested by the gas turbine engine 12, which in turn, reduces the amount of accumulation of the fine particles in the cooling circuits associated with the turbine 22*a*, for example. Moreover, the use of the spray of the dry fog 56 to agglomerate to the fine particles 36 (FIG. 5) reduces an amount of liquids that enter into the gas turbine engine 12, as the dry fog nozzle 44 is coupled to the separator manifold 72 so as to be positioned external to the inlet 52 and the dry fog nozzle 44 is orientated to direct the spray of dry fog 56 outward and away from the inlet 52 in the direction transverse to the airflow 54. In one example, the dry fog droplets 68 (FIG. 5) add less than about 0.05% water to the fine particles 36. The output of the spray of dry fog 56 that covers about 60% of a flow area of the inlet 52, with the flow area defined as the area between the first end 60, second end 62, first side 64 and second side 66, the spray of dry fog 56 reduced the amount of fine particles 36 entering the inlet duct 26 by about 74%. As a further example, the output of the spray of dry fog 56 that covers about 80% of a flow area of the inlet 52, with the flow area defined as the area between the first end 60, second end 62, first side 64 and second side 66, the spray of dry fog 56 reduced the amount of fine particles 36 entering the inlet duct 26 by about 84%.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An inlet particle separator system, for a gas turbine engine that is installed onboard a vehicle, comprising:

a source of pressurized water;

a source of pressurized air;

a separator manifold including a manifold inlet upstream from a first manifold outlet and a second manifold outlet, the manifold inlet configured to receive an incoming airflow, the first manifold outlet configured to be fluidly coupled to an inlet of the gas turbine engine to direct the incoming airflow into the inlet of the gas turbine engine, the inlet of the gas turbine engine including an inlet door, the separator manifold defining a tortuous path between the manifold inlet and the first manifold outlet, the first manifold outlet including a first sealing member coupled to a first sidewall of the separator manifold at the first manifold outlet and a second sealing member coupled to a second sidewall of the separator manifold at the first manifold outlet, the first sealing member configured to form a first seal between the separator manifold and the vehicle, and the second sealing member configured to form a second seal between the separator manifold and the inlet door;

at least one dry fog nozzle coupled proximate the manifold inlet so as to face at least partially away from the manifold inlet, the at least one dry fog nozzle fluidly coupled to the source of pressurized water to receive pressurized water and the source of pressurized air to receive pressurized air, the at least one dry fog nozzle configured to generate a spray of dry fog based on the pressurized water and pressurized air, the at least one dry fog nozzle positioned external to the separator manifold, and the at least one dry fog nozzle is configured to direct the spray of dry fog in a direction transverse to the incoming airflow outward and away from the manifold inlet to agglomerate with fine particles in the incoming airflow to form agglomerated particles; and a scavenging system coupled to the separator manifold downstream from the manifold inlet, and the scavenging system is configured to remove the agglomerated particles from the separator manifold.

2. The inlet particle separator system of claim 1, wherein the second manifold outlet is separated from the first manifold outlet by a splitter.

3. The inlet particle separator system of claim 2, wherein the scavenging system is fluidly coupled to the second manifold outlet and is configured to exhaust the agglomerated particles through the second manifold outlet.

4. The inlet particle separator system of claim 1, wherein the separator manifold is removably coupled to the inlet of the gas turbine engine.

5. The inlet particle separator system of claim 1, wherein the pressurized water supply and the pressurized air supply are a ground-based system, and the at least one dry fog nozzle, the separator manifold and the scavenging system are a vehicle-based system onboard the vehicle.

6. The inlet particle separator system of claim 1, wherein the pressurized water supply, the pressurized air supply, the at least one dry fog nozzle, the separator manifold and the scavenging system are a vehicle-based system onboard the vehicle.

7. The inlet particle separator system of claim 1, wherein the first sidewall interconnects the manifold inlet and the first manifold outlet, a third sidewall is opposite the first sidewall, a first end of the first sidewall comprises a first bellmouth curvature at the manifold inlet, a second end of the third sidewall comprises a second bellmouth curvature at the manifold inlet and the dry fog nozzle is positioned wholly external to the manifold inlet of the separator manifold proximate and upstream of the first bellmouth curvature and faces away from the manifold inlet to direct the spray of dry fog away from the manifold inlet.

8. The inlet particle separator system of claim 1, wherein the first sidewall further includes a convex curve downstream of the manifold inlet.

9. A method of providing a clean airflow to an inlet of a gas turbine engine installed onboard a vehicle, comprising:
fluidly coupling a separator manifold including at least one dry fog nozzle to an inlet duct of the gas turbine engine such that a first manifold outlet of the separator manifold is fluidly coupled to the inlet duct, the inlet duct including an inlet door, the at least one dry fog nozzle positioned external to a manifold inlet of the separator manifold, the manifold inlet upstream from the first manifold outlet, the separator manifold defining a tortuous path from the manifold inlet to the first manifold outlet, the first manifold outlet including a first sealing member coupled to a first sidewall of the separator manifold at the first manifold outlet and a second sealing member coupled to a second sidewall of the separator manifold at the first manifold outlet, the first sealing member configured to form a first seal between the separator manifold and the vehicle, and the second sealing member configured to form a second seal between the separator manifold and the inlet door;
fluidly coupling a pressurized water supply to the at least one dry fog nozzle to supply the at least one dry fog nozzle with pressurized water;
fluidly coupling a pressurized air supply to the at least one dry fog nozzle to supply the at least one dry fog nozzle with pressurized air;
outputting a spray of dry fog by the at least one dry fog nozzle based on the receipt of the pressurized water and the pressurized air outward and away from the manifold inlet in a direction transverse to an incoming airflow into the manifold inlet to agglomerate with fine particles in the incoming airflow to form agglomerated particles;
separating the agglomerated particles from the incoming airflow with the tortuous path defined between the manifold inlet and the first manifold outlet; and
exhausting the agglomerated particles though a second manifold outlet with a scavenging system.

10. An inlet particle separator system for a gas turbine engine that is installed onboard a vehicle, comprising:
a source of pressurized water;
a source of pressurized air;
a separator manifold including a manifold inlet upstream from a first manifold outlet, the manifold inlet configured to receive an incoming airflow, the first manifold outlet configured to be fluidly coupled to an inlet of the gas turbine engine to direct the incoming airflow into the inlet of the gas turbine engine, the inlet of the gas turbine engine including an inlet door, the separator manifold defining a tortuous path from the manifold inlet to the first manifold outlet, the first manifold outlet including a first sealing member coupled to a first sidewall of the separator manifold at the first manifold outlet and a second sealing member coupled to a second sidewall of the separator manifold at the first manifold outlet, the first sealing member configured to form a first seal between the separator manifold and the vehicle, and the second sealing member configured to form a second seal between the separator manifold and the inlet door;
at least one dry fog nozzle coupled proximate the manifold inlet so as to face at least partially away from the manifold inlet, the at least one dry fog nozzle fluidly coupled to the source of pressurized water to receive pressurized water and the source of pressurized air to receive pressurized air, the at least one dry fog nozzle configured to generate a spray of dry fog based on the pressurized water and pressurized air, the at least one dry fog nozzle external to the separator manifold, and the at least one dry fog nozzle is configured to direct the spray of dry fog in a direction transverse to the incoming airflow outward and away from the manifold inlet to agglomerate with fine particles in the incoming airflow to form agglomerated particles; and
a scavenging system coupled to the separator manifold downstream from the manifold inlet, and the scavenging system is configured to remove the agglomerated particles from the separator manifold.

11. The inlet particle separator system of claim 10, wherein the separator manifold includes a second manifold outlet, the second manifold outlet downstream from the first manifold outlet and separated from the first manifold outlet by a splitter, the scavenging system is fluidly coupled to the second manifold outlet and is configured to exhaust the agglomerated particles through the second manifold outlet.

12. The inlet particle separator system of claim 10, wherein the first sidewall interconnects the manifold inlet and the first manifold outlet, a third sidewall is opposite the first sidewall, a first end of the first sidewall comprises a first bellmouth curvature at the manifold inlet, a first end of the third sidewall comprises a second bellmouth curvature at the manifold inlet and the at least one dry fog nozzle is positioned external to the manifold inlet proximate and upstream of the first bellmouth curvature.

13. The inlet particle separator system of claim 10, wherein the pressurized water supply and the pressurized air supply are a ground-based system, and the at least one dry fog nozzle, the separator manifold and the scavenging system are a vehicle-based system onboard the vehicle.

14. The inlet particle separator system of claim 10, wherein the separator manifold is removably coupled to the inlet of the gas turbine engine.

* * * * *